United States Patent

[11] 3,580,000

[72] Inventor Richard C. Wagner
 Clarendon Hills, Ill.
[21] Appl. No. 807,904
[22] Filed Mar. 17, 1969
[45] Patented May 25, 1971
[73] Assignee Integral Process Systems, Inc.

[54] CHAMBER FOR FOOD TREATING APPARATUS
 11 Claims, 9 Drawing Figs.
[52] U.S. Cl. .................................................. 62/77,
 62/303, 62/380, 198/229
[51] Int. Cl. ...................................................... F25d 3/10,
 F25d 25/04
[50] Field of Search .......................................... 62/363,
 278, 380; 198/229
 134/(Inquired); 79/(Inquired); 75/(Inquired)

Primary Examiner—William E. Wayner
Attorney—Dressler, Goldsmith, Clement and Gordon ABSTRACT: To provide for the ease of cleaning of an elongated food treating chamber, such as a flash freezing chamber, which contains a conveyor for the passage of food therethrough, means are provided for separating the chamber into sections, opening a lid portion of each section and lifting the conveyor out of the chamber by means of lifting jacks which pass through the spaces between the separated sections.

Another aspect of the invention provides means for accommodating differential thermal expansion or contraction of inner and outer walls of the chamber section by connecting said inner and outer walls only by cover caps and end caps which are slidably attached thereto.

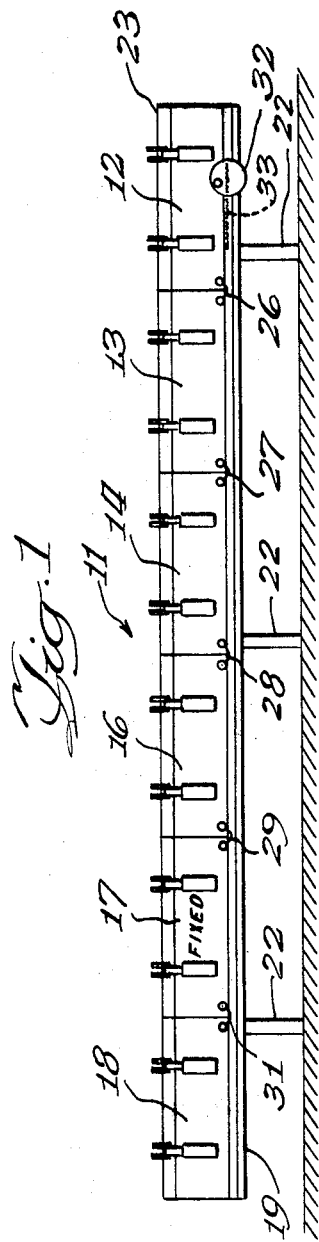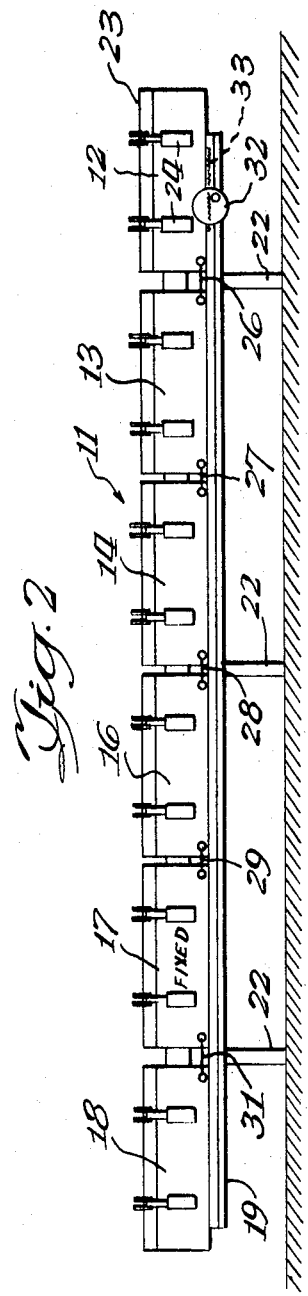

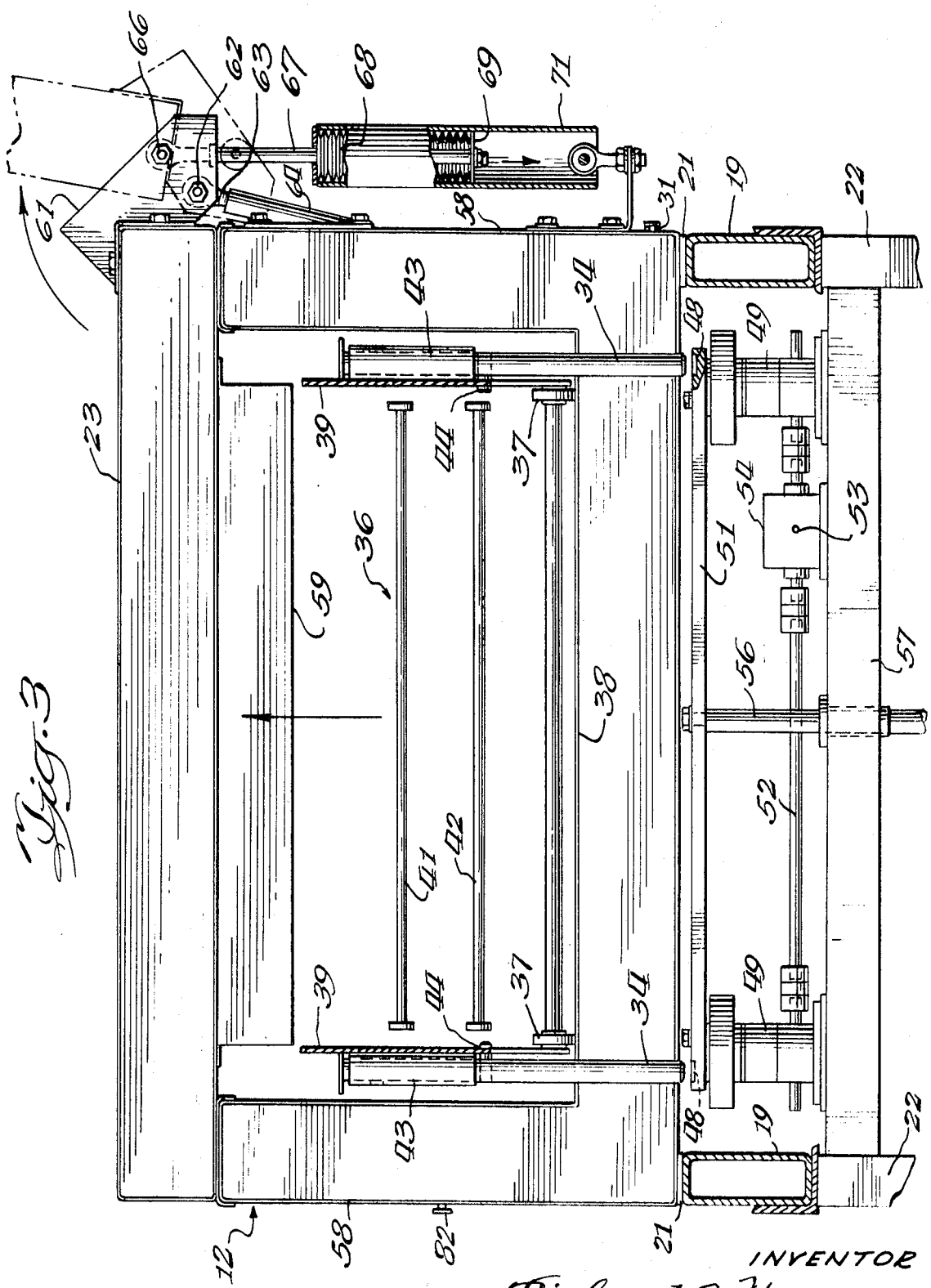

Patented May 25, 1971
3,580,000
4 Sheets-Sheet 3
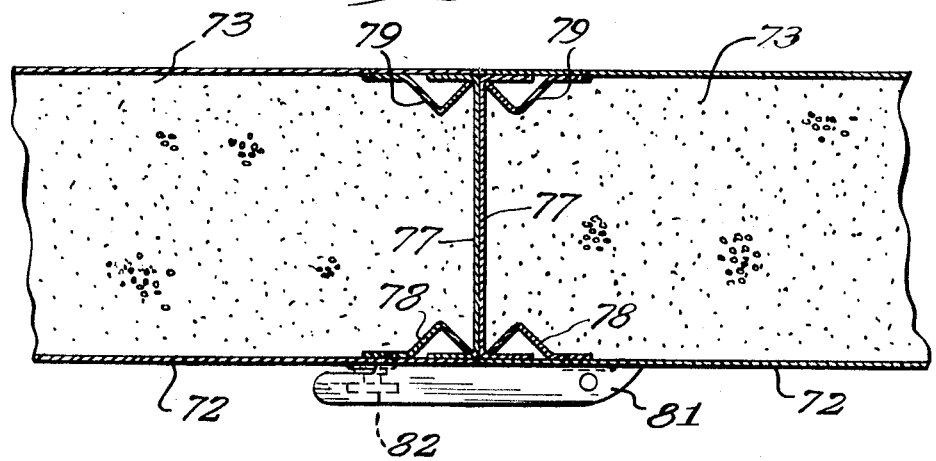
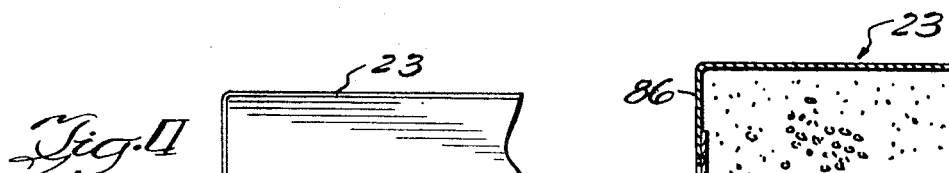
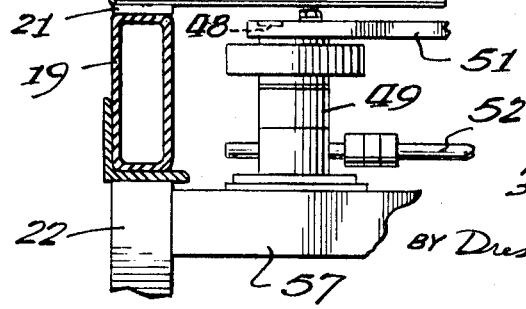
INVENTOR
Richard C. Wagner
BY Dressler, Goldsmith, Clement & Gordon
ATTORNEYS

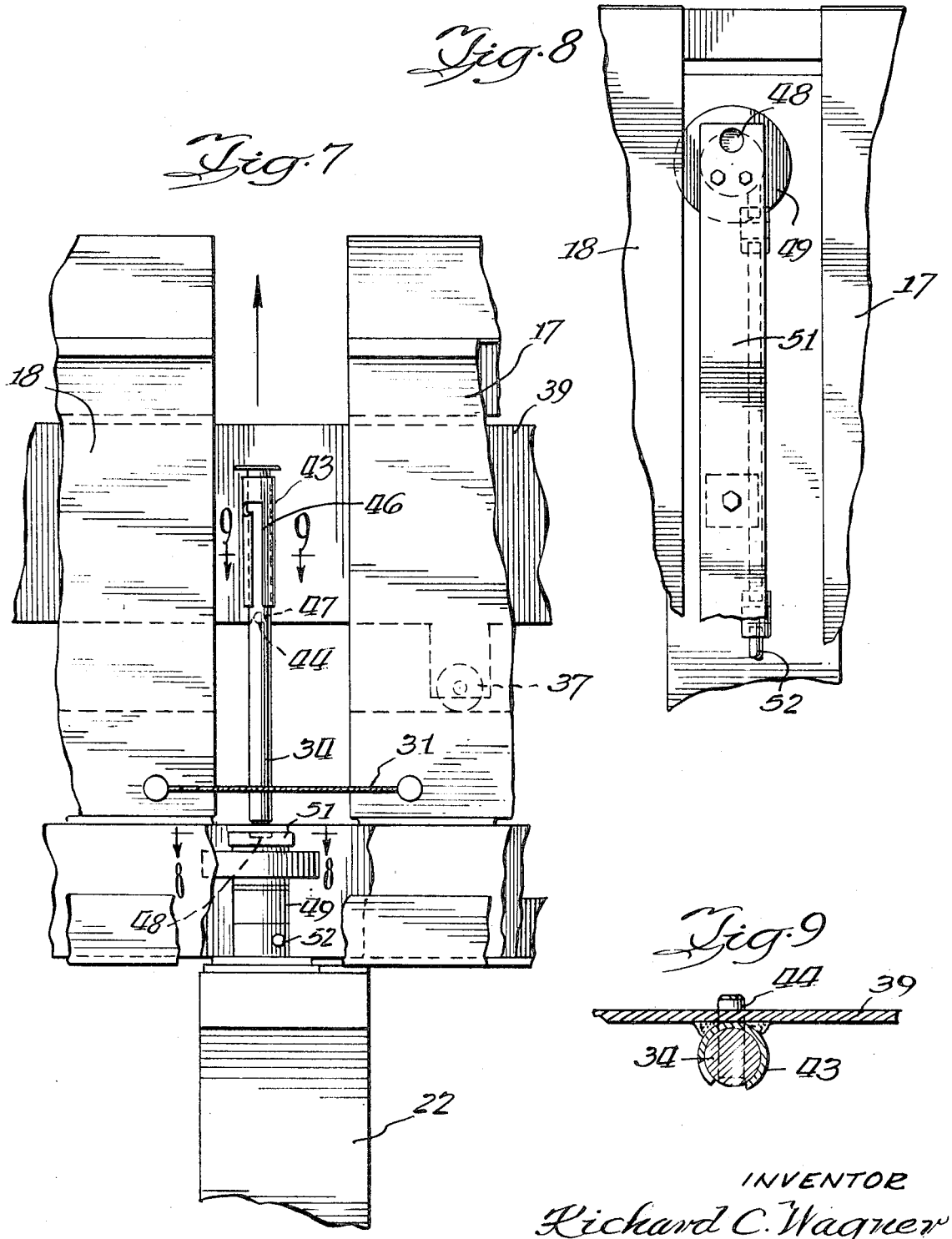

3,580,000

CHAMBER FOR FOOD TREATING APPARATUS

SUMMARY OF THE INVENTION

This invention relates to food treating apparatus and processes in which food articles are passed on a conveyor through an open-ended, elongated chamber or tunnel, and more particularly, to apparatus and processes for cleaning such chambers and conveyors. An important application of this invention is in flash freezing systems wherein food products are quickly frozen by contact with a cryogenic liquid and a rapidly circulating refrigerant gas, such as liquid and gaseous nitrogen.

Flash freezing apparatus such as the apparatus of FIGS. 7, 8 and 9 of U.S. Pat. No. 3,277,657, issued Oct. 11, 1966, or the apparatus of U.S. Pat. No. 3,431,745, issued Mar. 11, 1969, is conveniently in the form of an elongated open-ended chamber, or tunnel, through which a conveyor is run to transport food articles into, through and out of the tunnel. In such apparatus, crumbs and food particles are frequently broken or fragmented off the food articles and remain in the interstices of the conveyor, or fall off or through the conveyor onto the bottom of the chamber. If such crumbs or particles are permitted to remain in the apparatus, spoilage can take place which can contaminate the fresh food passing through the system. It is therefore desirable to provide a system for easy cleaning of the apparatus, including both the conveyor and the chamber, itself.

In U.S. Pat. No. 3,431,745, issued Mar. 11, 1969, to John D. Harper, Frederick Breyer and Richard C. Wagner, there is disclosed a flash freezing system in which the conveyor can be moved out of the chamber through one end thereof so that both the conveyor and the chamber interior can be hosed down for cleaning. This system is generally satisfactory for chambers and conveyors up to about 30 feet in length but becomes inconvenient with longer apparatus. With longer apparatus, removal of the conveyor may be impractical because there may be inadequate floor space. It is also difficult to hose down the interior of long chambers because the water stream sweeping away the food particles may slow down before reaching the end of the chamber and the food particles may be redeposited.

In accordance with the present invention, the problems of inadequate floor space and of cleaning long chambers are obviated by providing a chamber separable into sections and providing lifting means to remove the conveyor upward from the chamber sections after the chamber sections are opened at the top by displacing the lid portions thereof.

The chamber sections are supported on rails and are bolted together by toggle bolts when the chamber is in operation. When the chamber is shut down for cleaning, the toggle bolts are opened and the sections moved along the rails to open up spaces between them. Some of the sections are moved far enough apart to permit lifting jacks to pass between them and engage and lift the conveyor.

The sections are provided with hinged lid portions which can be turned away to open the chamber sections at the top and permit upward removal of the conveyor.

In order to provide sufficient lift amplitude for the lifting jacks, retractable pins are provided in the conveyor. These pins are dropped into the spaces between the chamber sections to engage the jacks before the lifting operation is commenced.

Another aspect of the invention concerns the provision for differential expansion of the inner and outer walls of the chamber sections. When the chamber is not being operated, the inner and outer walls are at about the same temperature, but when liquid nitrogen is being vaporized there is a difference of several hundred degrees Fahrenheit between the inner and outer walls of the chamber, separated by insulation.

Under these circumstances, the inner wall contracts and without special provisions, there will be considerable stresses set up in the walls and in some cases the stresses could force separation between the sections and excessive loss of nitrogen. In this invention in its preferred aspects, the inner and outer walls of the chamber sections are not rigidly connected to each other or to any common structure. The connections between the two are through cover plates and through end plates; and the plates are slidably connected to the walls.

DETAILED DESCRIPTION OF THE INVENTION

The invention may be best understood by reference to the drawings in which:

FIG. 1 is a side elevation, schematically showing the separate sections of the chamber in juxtaposition to each other as the chamber is in operating position;

FIG. 2 is a side elevation similar to FIG. 1, except that the sections are shown in separated position, ready for the opening of the lid portions and the lifting of the conveyor;

FIG. 3 is a transverse section of a single section of the chamber, showing the lid mechanism and the lifting mechanism with the pins in the conveyor in dropped position ready for lifting;

FIG. 4 is a fragmented transverse section similar to FIG. 3, except that the pins are shown in retracted position as they would be during the flash freezing operation;

FIG. 5 is a sectional view along plane 5–5 of FIG. 4, showing the construction of the ends of the chamber sections and the means for bolting them together;

FIG. 6 is an enlarged and more detailed view of the upper left corner of FIGS. 3 and 4, showing the side wall and lid construction;

FIG. 7 is an enlarged side elevation, partly in cross section of a fragmented portion of the conveyor between two separated chamber sections, showing the structure of the retractable pin and its relationship to the lifting jack;

FIG. 8 is a plan view of the lifting jack assembly as seen from plane 8–8 of FIG. 7; and FIG. 9 is an enlarged cross-sectional view along plane 9–9 of FIG. 7.

As shown in FIGS. 1 and 2, the chamber 11 may typically comprise six chamber sections 12, 13, 14, 16, 17 and 18, reading respectively from right to left, or from the inlet end of food articles to the outlet end. Section 16, the next to last section is fixed in position and carries the permanent chamber connections for liquid nitrogen feed and recirculation and the fan for gaseous nitrogen recirculation, as shown in U.S. Pat. No. 3,431,745.

The chamber sections are supported by rails 19, which (as shown in FIGS. 3 and 4) are faced with plastic strips 21 to minimize friction when the chamber sections are moved along the rail for separation or for rejuncture. The rails are supported from the floor by vertical support members 22.

Each of the chamber sections (as shown in chamber 12 of FIGS. 1 and 2) includes a lid 23 and a lid operating mechanism 24, described in more detail hereinbelow in connection with FIG. 3.

A series of chains 26, 27, 28, 29 and 31 connect the chamber sections and restrict the permissible separation between adjacent sections when the sections are pulled apart, as shown in FIG. 2. Chains 26 and 31, the first and last chains of the series are longer than the others to permit greater separation at those portions of the chamber which overlie the lifting jacks so that the jacks may pass between the sections to engage the conveyor. Typically, chains 26 and 31 may be dimensioned to permit a six inch separation between the sections to which they are attached while the remaining chains permit only 2 inch separations, large enough to permit food particles to be washed therethrough.

The chamber sections may be moved apart by direct hand pulling, but as shown in FIGS. 1 and 2, a screw drive mechanism 32 may be provided on the support rail 19 to engage a thread 33 on the underside of chamber 12 to provide the mechanical force to separate the chamber sections.

FIG. 3 shows a cross section of chamber section 12 in separated position with the retractable pins 34 of the conveyor structure 36 in dropped position. The conveyor structure includes support rollers 37 which rest on the bottom inner wall 38 of the chamber section when the apparatus is in operation, sidewalls 39, and top and bottom conveyor rollers 41 and 42, respectively, which are supported (by means not shown) by conveyor sidewalls 39 and which carry a mesh conveyor (not shown).

Slotted sleeves 43 are mounted on the conveyor sidewalls 39 and retractable pins 34 are slidably carried thereby. Each retractable pin 34 has a projecting pin 44 which can lock the retractable pin into either in upper (retracted) or lower (dropped) position. FIG. 3 shows the retractable pins in their dropped position and FIG. 4 shows one of the pins in its retracted position.

As shown in FIGS. 7 and 9, sleeve 43 contains an L-shaped slot 46 so that the retractable pin may move vertically when the projection pin is aligned with the vertical portion of the slot and so that the retractable pin may be locked into its upper position when the projection pin is rotated onto the horizontal leg of the L.

There is also a notch 47 (FIG. 7) provided on the underside of sidewall 39 to hold the projection pin from upward movement and thereby lock the retractable pin in its dropped position.

When the retractable pins 34 are in dropped position their lower ends are in register with depressions 48 on the upper face of bar 51 which rests on screw jacks 49 and connects them. The lowering of the retractable pins so that their lower ends lie within, or just above, depressions 48 enables the jacks to achieve the full lifting effect of their limited lifting range.

Of course, a similar lifting mechanism is used to operate in the space between chamber sections 17 and 18 near the discharge end of the conveyor; and if necessary or desired, a third lifting mechanism may operate between chamber sections 14 and 16 to raise the center of the conveyor.

The screw jacks 49 lifting the right and left ends of bar 51 operate in unison since both are driven by the rotation of the transverse drive shaft 52. Similarly, the lift mechanisms at each end of the conveyor operate in unison since each transverse drive shaft 52 is driven by the motor-driven rotation of a common longitudinal drive shaft 53 (shown only in FIG. 3) through each gear box 54. The lifting and lowering of each bar 51 is stabilized by a guide rod 56 which is slidably mounted on horizontal support member 57 which connects the vertical support members 22.

FIGS. 3 and 4 also show lid member 23 sealed against the upper ends of the sidewalls 58. Plenum chamber 59 for the recirculation of gaseous nitrogen from a fan to another portion of the process chamber is integrally constructed with lid 23.

Since upward removal of the conveyor from the chamber sections requires displacement of the lid from its normal position, means are provided to swing the lid out of the upward path of the rising conveyor. The means includes a plate 61 attached to an upper corner of the lid and mounted to rotate about a pivot pin 62 in the eye of eye bolt 63 which is adjustably held by sleeve 64. Another pin 66 is attached to plate 61 at a position outward of pivot pin 62, pin 66 being in the eye of eye bolt 67 which is urged downward by the compression of spring 68 against piston 69 within cylinder 71, and thereby acting against the weight of the lid 23, and assisting in its displacement to the position shown fragmentarily in phantom in FIG. 3.

FIGS. 5 and 6 illustrate the means provided in accordance with this invention to minimize apparatus stresses caused by temperature differentials and thereby maintain tight seals between the chamber sections when they are in juxtaposition and the apparatus is operating.

FIG. 6 is an enlarged cross-sectional fragmentary view similar to the upper left corner of FIGS. 3 and 4, but showing the wall structure in more detail. As may be seen, the outer wall 72 and the inner wall 73 of the chamber section terminate at their upper ends in L-shaped bends toward each other, and the upper ends are covered by a cover cap 74 which also covers the opening between the L-shaped bends. Double acting clip 76 runs the entire length of the cover cap and is rigidly attached at its middle to the underside of the cover cap. The opposite ends of the clip tend to push the inner and outer walls upward and outward at their L-shaped bends to maintain the walls in frictional engagement with the cover cap.

When the apparatus is in operation, the temperature of the inner wall may be several hundred degrees Fahrenheit lower than the temperature of the outer wall, and this temperature differential will cause the inner wall to contract, primarily in length. The inner wall will then slide relative to clip 76 and little or none of the thermal stress will be transmitted to the outer wall.

The ends of the vertical walls of adjacent chamber sections are shown in FIG. 5, wherein 72 and 73 are the outer walls and inner walls, respectively, as in FIG. 4. End caps 77 fit between the inner and outer walls and are held in place by clips 78 attached to outer walls 72 and by clips 79 attached to inner walls 73. In operation, walls 73 will shrink and foreshorten their overlap of the lips of end caps 77, but will stay in frictional engagement with the end caps by reason of the action of the clips and will not transmit their thermal stresses to the outer walls.

Toggle bolt 81 is adapted to engage pin 82 to affix the chamber sections to each other firmly during operation.

The lid 23 (as shown in FIG. 6) has a similar structure, except that the inner wall 83 is itself the cap, held in place by clips 84 against the L-shaped ends of the outer wall 86.

When the apparatus of this invention is shut down for cleaning, after the nitrogen flow has been shut off and the food on the conveyor has been removed, the toggle bolts locking the chamber sections to each other are opened and sections 12, 13, 14 and 16 are moved to the right to be separated from stationary section 17 and from each other. The movement is achieved by hand cranking the screw conveying mechanism 32. As section 12 moves toward the right, chain 26 will extend until all the play in it is used up, then section 13 will move and take up the play in chain 27, and so on.

Section 18 is moved to the left, either by hand (by means of handles not shown) or by a screw drive mechanism, such as 32.

Typically, sections 12, 13, 14, 16, 17 and 18 are each 60 inches in length and the separation between adjacent sections is about 2 inches, except for the separations closest to the ends where the separations are about 6 inches.

The lid member of each of the sections is then opened, the opening being assisted by the counterbalancing force exerted by spring 68.

Retractable pins 34 are then rotated and dropped and then rotated again so that projection pins 44 rest in notches 47, locking the pins in lowered position. Then the lifting motor is activated, rotating longitudinal drive shaft 53 which acts through gear boxes 54 to rotate transverse drive shafts 52 which raise the screw jacks 49. As the screw jacks move upward, they raise the conveyor to a level above the tops of the conveyor sections and the conveyor and the separate chamber sections may then be hosed down, or otherwise cleaned.

During the hosing operation, cover caps 74 protect the insulation between the inner and outer walls from wetting with water.

Reassembly reverses the above steps.

While the invention has been described in relation to its preferred embodiments, it will be understood by those skilled in the art that various modifications may be employed without departing from the scope of the invention.

For example, hydraulic lifting jacks may be employed in place of the screw jacks described above. The chamber may comprise a greater or a lesser number of sections than the six shown in FIGS. 1 and 2. Rollers may be used in place of the plastic strips to minimize friction on the rails; and other means may be employed to provide the force necessary to separate the chamber sections.

The thermal expansion and contraction features of this invention are more broadly applicable than in the specific environment described above since they can be utilized in unitary as well as sectional chambers and can be used in chambers used in heating processes, e.g., baking, as well as freezing processes.

The conveyor removal features of the invention are also more broadly applicable and are useful in connection with tunnel chambers containing food-carrying conveyors regardless of whether the interior of the chambers is very cold, very hot, or neither.

Other changes and variations may be made by those skilled in the art without departing from the spirit and scope of the appended claims.

I claim:

1. A food treating apparatus comprising an open-ended, elongated, horizontally disposed chamber having a conveyor passing therethrough, said chamber comprising a plurality of separable sections affixed to each other in end-to-end relationship during the operation of said apparatus, each of said sections comprising a lower body portion and an upper lid portion, each of said portions extending the entire length of said section, means for displacing each of said lid portions from each of said body portions to permit the lifting of said conveyor, means situated below said chamber portions to lift said conveyor and means to separate said conveyor sections to enable said lifting means to move into engagement with said conveyor.

2. The apparatus of claim 1 wherein said lid displacing means comprises a hinge and a means to partially counterbalance the weight of said lid section.

3. The apparatus of claim 1 wherein said lifting means comprises a screw jack adapted to lift said conveyor at at least two points along its length.

4. The apparatus of claim 1 wherein said lifting means comprises a hydraulic jack adapted to lift said conveyor at at least two points along its length.

5. The apparatus of claim 1 wherein said conveyor comprises downwardly extensible support members adapted to engage said lifting means.

6. An apparatus for the flash freezing of food in accordance with claim 1.

7. An apparatus for the heat treating of food in accordance with claim 1.

8. The apparatus of claim 1 wherein each of said chamber body sections comprises an inner wall, an outer wall and insulating means therebetween and means are provided to permit the length of said inner wall to respond to temperature fluctuations independently of the length of said outer wall.

9. The apparatus of claim 8 where in said last-named means comprises a cover cap member extending the length of said chamber body section and slidably attached to said inner and outer walls and an end cap member extending the height of said chamber body section and slidably attached to said inner and outer walls.

10. The apparatus of claim 9 wherein said cover cap is attached to said inner and outer walls by clips attached to the underside of said cap.

11. A method for cleaning a food treating apparatus comprising a horizontally disposed open-ended chamber having a conveyor therewithin and made up of a plurality of separate lidded sections held in end-to-end relationship which method comprises separating said chamber sections from each other, opening the lids of said sections, passing a lifting mechanism between at least two of said separated sections to lift said conveyor above the level of said sections, and thereafter cleaning said conveyor and the interior walls of said separated conveyor sections.